United States Patent [19]
Jacobsen et al.

[11] Patent Number: 5,781,164
[45] Date of Patent: Jul. 14, 1998

[54] MATRIX DISPLAY SYSTEMS

[75] Inventors: Jeffrey Jacobsen, Hollister, Calif.; John C. C. Fan, Chestnut Hill; Jack P. Salerno, Waban, both of Mass.

[73] Assignee: Kopin Corporation, Taunton, Mass.

[21] Appl. No.: 442,808

[22] Filed: May 17, 1995

Related U.S. Application Data

[63] Continuation of Ser. No. 971,326, Nov. 4, 1992, abandoned.

[51] Int. Cl.$^6$ ................................................ G09G 3/36
[52] U.S. Cl. ........................ 345/87; 345/206; 349/140
[58] Field of Search ........................... 345/87, 100, 103, 345/211, 98, 8, 58, 84, 92, 93, 94, 95, 96, 99, 206; 359/54, 55, 57, 58, 59; 257/778, 350; 437/21; 349/122, 140, 151

[56] References Cited

U.S. PATENT DOCUMENTS

| | | | |
|---|---|---|---|
| 4,008,564 | 2/1977 | Luce et al. | 340/784 |
| 4,190,855 | 2/1980 | Inoue | 257/778 |
| 4,571,584 | 2/1986 | Suzuki | 345/98 |
| 4,660,935 | 4/1987 | Iwashita et al. | 350/336 |
| 4,694,347 | 9/1987 | Ito | 358/236 |
| 4,807,974 | 2/1989 | Hirai | 350/332 |
| 4,886,343 | 12/1989 | Johnson | 350/335 |
| 4,908,710 | 3/1990 | Wakai et al. | 340/784 |
| 4,917,468 | 4/1990 | Matsuhashi et al. | 350/332 |
| 4,952,031 | 8/1990 | Tsunoda et al. | 350/342 |
| 5,041,823 | 8/1991 | Johnson et al. | 345/94 |
| 5,051,739 | 9/1991 | Hayashida et al. | 345/98 |
| 5,093,655 | 3/1992 | Tanioka et al. | 345/96 |
| 5,115,232 | 5/1992 | Iizuka | 340/784 |
| 5,191,453 | 3/1993 | Okumura | 359/59 |
| 5,200,847 | 4/1993 | Mawatari et al. | 359/59 |
| 5,206,749 | 4/1993 | Zavracky et al. | 359/59 |
| 5,294,556 | 3/1994 | Kawamura | 437/21 |
| 5,309,523 | 5/1994 | Iwaki et al. | 382/42 |
| 5,343,064 | 8/1994 | Spangler et al. | 257/350 |
| 5,347,154 | 9/1994 | Takahashi et al. | 359/59 |
| 5,485,173 | 1/1996 | Scheffer et al. | 345/100 |

OTHER PUBLICATIONS

T.J. Scheffer and B. Clifton, "Active Addressing Method for High–Contrast Video–Rate STN Displays", SID 1992 Digest of Technical Papers XXIII:228–231 (1992).

P. Pleshko, "Overview and Status of Information Displays", 1992 SID International Symposium, Boston, Seminar M–O (May 18, 1992).

T. Scheffer and J. Nehring, "Supertwisted Nematic (STN) LCDs", 1992 SID International Symposium, Boston, Seminar M–1 (May 18, 1992).

F. Funada, "Process and Problems in Manufacturing LCD Cells", 1992 SID International Symposium, Boston, Seminar M–2 (May 18, 1992).

Primary Examiner—Dennis-Doon Chow
Attorney, Agent, or Firm—Hamilton, Brook, Smith & Reynolds, PC

[57] ABSTRACT

A passive matrix display device obtains fast response times and high resolutions by fabricating the control circuitry and passive matrix electrodes together as a single monolithic device. The electrodes and the control circuitry are fabricated as an SOI structure on a substrate. The structure is removed from the substrate and transferred to a glass substrate using a lift-off and transfer process. Performance is further increased by incorporating an active addressing procedure instead of standard multiplex addressing.

18 Claims, 14 Drawing Sheets

MATRIX DISPLAY SYSTEMS

This application is a continuation of application Ser. No. 07/971,326 filed on Nov. 4, 1992, now abandoned which is incorporated herein by reference in its entirety.

BACKGROUND OF THE INVENTION

Liquid-crystal displays (LCD) can be categorized into two types, passive-matrix (PMLCD) and active-matrix (AMLCD). These display panel technologies are important as they provide improved capabilities relative to existing cathode ray tube display technology.

Currently, most PMLCD's are operated in the transmissive mode with a backlight. For screen luminance appropriate for office environments, this backlight consists of fluorescent tubes with a diffuser for producing a uniform surface brightness over the display surface.

Using typical data for panel transmissivity and backlight efficiency, a 10-inch diagonal, 640×480 line, monochrome, directly-matrix-addressed, double-layer super-twisted nematic (STN), liquid-crystal display with 15 foot-lamberts areal luminance at the front display surface, the backlight power required is about 3.9 watts with an additional 1.0 watt of circuit power. This is significantly lower then the power required for a monochrome CRT, which typically requires 30 watts.

Color LCDs require more power than monochrome displays. To produce color in liquid-crystal technologies, one of the substrates incorporates red-green-blue (RGB) striped color filters. With typical transmissivities the backlight power requirements increase by 3 times. However, even with this higher power requirement over monochrome the LCD consumes less power than any of the other competing color emissive display technologies.

Two parameters limiting the application of PMLCD in displays are the response time and the viewing angle. Developments in PMLCD material and cell construction that improve the contrast ratio and viewing angle characteristics have resulted in liquid-crystal materials having slower response times. Current nematic liquid-crystal mixtures have response times of the order of 200 milliseconds, which is much slower than the 80 milliseconds maximum required in mouse and cursor applications and far slower than the 15 milliseconds required by video application. Using higher birefringence materials and decreasing the cell gap from the typical 6-7 microns to 4-5 microns, response times of 50-90 milliseconds have been obtained.

The viewing angle as a function of contrast ratio has been improved, achieving a horizontal included viewing angle of 50 degrees with a contrast ratio greater than 5. In addition, the maximum contrast ratio has been increased to the range of 9-15, for the STN liquid-crystal materials.

The size capability of PMLCD displays are limited, in part, by the contrast ratio and the viewing angle requirements. The contrast ratio and viewing angle generally decrease with an increased number of multiplexed lines.

SUMMARY OF THE INVENTION

A preferred embodiment of the present invention provides a passive matrix display device with higher resolution, smaller size, and improved response time. Rapid response times are obtained by fabricating the control circuitry in s ingle crystal silicon or an essentially single crystal silicon thin film as defined in a related U.S. application referenced hereinafter. Such thin films can be fabricated to form a silicon-on-insulator ("SOI") structure. The electrodes can also be formed in the same thin film of single crystal silicon as the control circuitry. After the SOI structure and control circuitry is fabricated on a substrate, the structure is removed from the silicon substrate and transferred to a glass or other optically transparent substrate as a single structure using a lift-off and transfer process. The control circuitry can thus be fabricated with the electrodes as a monolithic device. By using single crystal material, the control circuitry can be more densely fabricated and the operating speeds of such passive displays can be significantly increased.

A preferred embodiment of the display device utilizes an active addressing procedure instead of the standard multiplexing procedure. This permits the display to operate at much higher speeds without reducing resolution. Displays having outer dimensions of 2 inches×2 inches, and preferably, at or less than 1 inch×1 inch, and having a display format (column×row) of 640×480, 1280×1024, 2048×2048 or 1580×1280 can be fabricated utilizing the methods described herein. By using such small displays the voltage drop across each electrode can be reduced, thereby providing lower levels of crosstalk between adjacent pixels. Electrodes can therefore be positioned closer together to enhance display resolution. Circuitry for active addressing of the display including multiplexers, shift registers and video interface circuitry can also be formed in the thin film of single crystal silicon on transferring directly onto the display substrates.

BRIEF DESCRIPTION OF THE DRAWINGS

The above, and other features of the invention including various novel details of construction and combination of parts, will now be more particularly described with reference to the accompanying drawings. It will be understood that the particular display device and the methods used in fabricating the display device which embody the invention are shown by way of illustration only and not as a limitation of the invention. The principle features of this invention can be employed in various embodiments without departing from the scope of the invention.

DETAILED DESCRIPTION OF THE INVENTION

Figure 1:
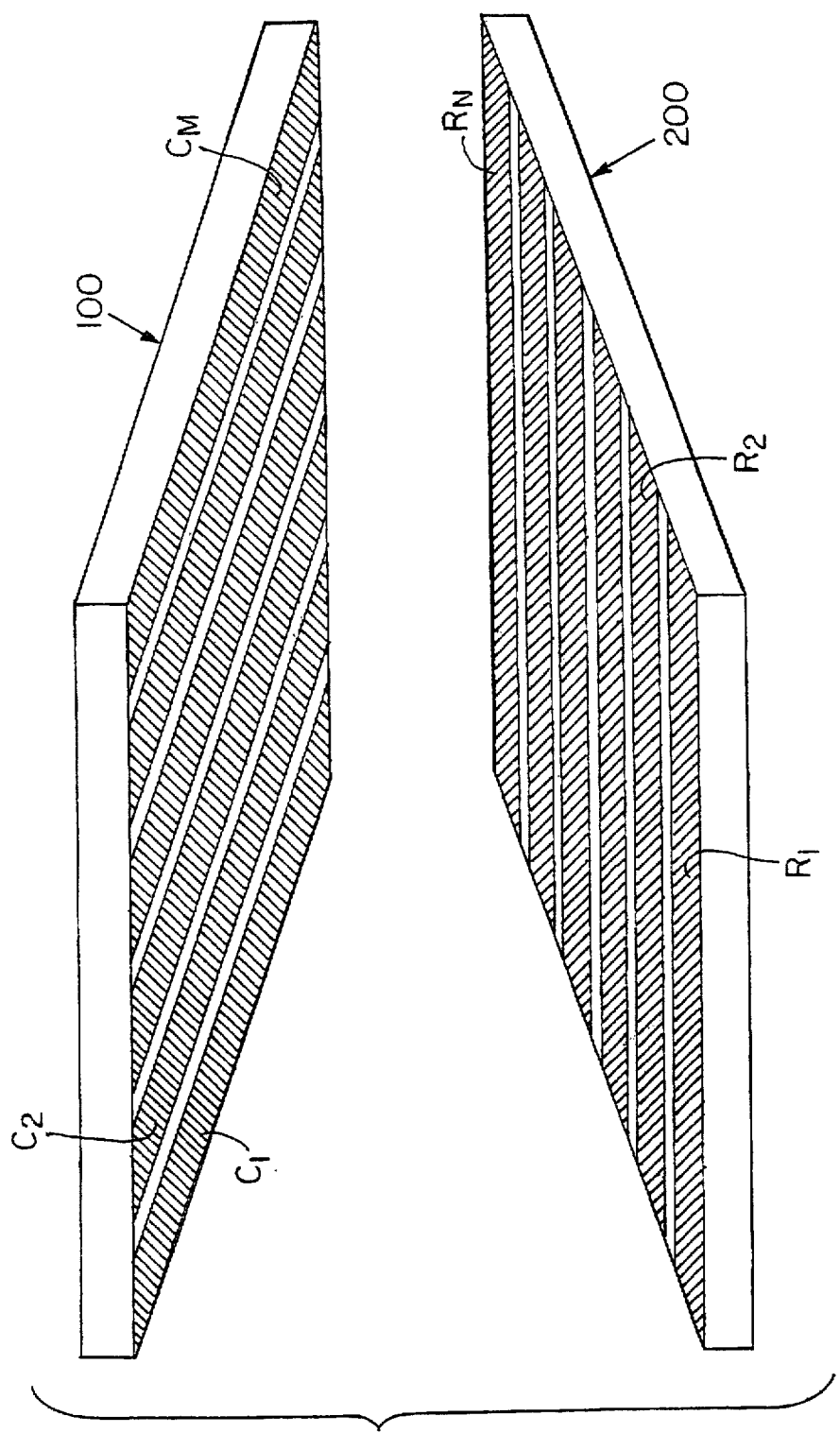
FIG. 1 is a schematic illustration of an electrode configuration for a multiplexed LCD.

The electrode configuration of a direct multiplexed liquid crystal display is schematically illustrated in FIG. 1. An upper electrode plate 100 and a lower electrode plate 200 are patterned with electrodes such as transparent conductor strips of Indium/Tin oxide (ITO). The electrodes can be fabricated with standard photo-lithography techniques.

Alternatively, the electrodes can be formed using deposition techniques (e.g., sputtering, Chemical Vapor Deposition, i.e., CVD). Other materials or metals can be used for electrodes on either the upper plate, the lower plate, or both. These material can be aluminum or they can be formed in a thin film of single crystal silicon that is doped to have the desired electrical conductivity. The electrodes can also be a composite structure including a metallized layer such as aluminum that is deposited over a layer or strip of single crystal silicon. The use of single crystal silicon as an electrode material in a liquid crystal display is described in U.S. application Ser. No. 07/944,207 filed on Sep. 11, 1992 which is incorporated herein by reference.

Column strips $C_1, \ldots, C_M$ are patterned on one plate 100 and row strips $R_1, \ldots, R_N$ are patterned on the other plate 200. In a preferred embodiment, the electrodes are about 250 microns wide and are separated by a gap about 250 microns wide. In another preferred embodiment, the electrodes are about 55 microns wide and the gaps are about 8 microns wide.

The plates 100, 200 are placed together with the ITO strips running at right angles to each other, leaving a gap of about 4–6 microns between the plates for liquid crystal material. The areas where the ITO strips overlap define the areas of the pixels. Each pixel is accessible through corresponding electrode pairs.

High information content displays are obtained using multiplexing techniques. Using multiplexing, a large number of pixels are addressed using a small number of electrical contacts to the display. In particular, a display with M columns and N rows is addressed with M+N electrical contacts, yielding an M×N pixel display. A disadvantage of multiplexing is that voltages cannot be arbitrarily changed at one element without affecting the voltages at other elements. This disadvantage is known as crosstalk.

Multiplexing in a Liquid Crystal Display (LCD) exploits the property that liquid crystal responds only to the root-mean-square (RMS) value of the voltage appearing across the pixel when the characteristic time constant of the display is long compared to the period of the applied signals. Thus, many different pulse waveforms having the same RMS value can be applied to the pixel to give the same optical appearance. Changing the waveform applied to a column electrode changes the waveform applied to all the pixels in that column, but the waveform does not necessarily change the RMS voltage at those pixels. A preferred embodiment of the invention employs a standard multiplexed addressing method. Another preferred embodiment of the invention employs an active addressing multiplex method.

Figure 2:
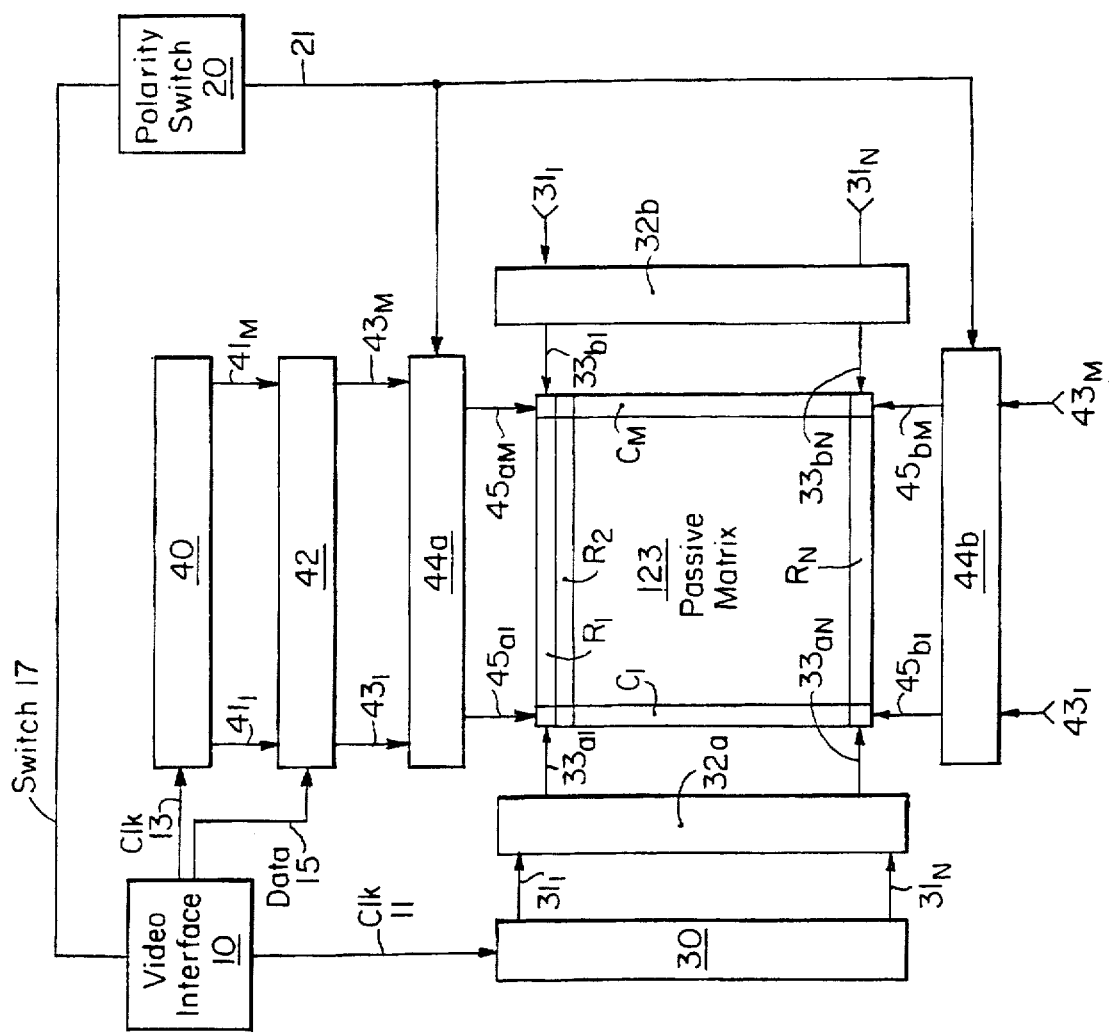
FIG. 2 is a schematic block diagram of a preferred passive matrix display device.

FIG. 2 is a schematic block diagram of a preferred passive matrix display device. A video interface 10 couples the display device to an external video source (not shown). The video interface 10 supplies a scan line clock signal on line 11, a pixel clock signal on line 13, a pixel data signal on line 15, and a frame switch signal on line 17. The video signal source can be any analog or digital signal video source including a Video Graphics Array (VGA) adapter, National Television Systems Committee (NTSC) composite video source, high-resolution professional display adapters, charge-coupled-devices (CCD), or other similar sources. In a preferred embodiment, the video interface 10 converts the video signal from the video source into an appropriate timing signal for the subject passive matrix 123. In other words, the passive matrix display device operates as a multiple frequency scanning display device.

In a preferred embodiment, the passive matrix display area has a horizontal resolution of 640 pixels (M=640) and a vertical resolution of 480 pixels (N=480). Such a display matrix has a 640H×480V resolution. In an alternative embodiment, the display resolution is 1024H×768V. In another alternative embodiment, the display resolution is 2048H×2048V. The video interface 10 converts the video signal to the subject display resolution (e.g., 640H×480V).

The select line clock on line 11 is received by a row shift register 30. Row select pulses of amplitude S are sequentially applied over line 11 during a frame period, T. When the last row, $R_N$, is pulsed, the process begins anew, starting with the first row, $R_1$, at the beginning of the next frame period.

The vertical scanning period, $\Delta t$, of an N row display is given by T/N. Voltage is applied to each row electrode in sequence for the duration of the respective vertical scanning period, $\Delta t$. As each row signal is received, a row shift register 30 simultaneously signals the left row driver 32$a$ and a right row driver 32$b$ over data lines $31_1, \ldots, 31_N$. The select lines are driven from both sides to reduce the signal loss across the row electrodes. The row electrodes are driven from the left row driver 32$a$ over lines $33_{a1}, \ldots, 33_{aN}$. Similarly, the row electrodes are driven by the right row driver 32$b$ over lines $33_{b1}, \ldots, 33_{bN}$. The row signals are independent of the data being displayed.

Unlike the row signals, the column signals depend on the data to be displayed. The pixel clock signal on line 13 is received by a column shift register 40. The column shift register 40 supplies column select data to a multiplexer 42 over data lines $41_1, \ldots, 41_M$. The multiplexer 42 also receives the pixel data signal on line 15. In response, the multiplexer 42 generates an addressing signal on lines $43_1, \ldots, 43_M$.

The column voltages are supplied by an upper column driver 44$a$ and a lower column driver 44$b$. As with the row electrodes, the column electrodes are preferably driven from both ends to reduce the signal loss across the column electrodes. The column drivers 44$a$,44$b$ simultaneously receive a multiplex address signal from the multiplexer 42 over data lines $43_1, \ldots, 43_M$. In turn, the column drivers 44$a$,44$b$ drive the column electrodes over signal lines $45_{a1}, \ldots, 45_{aM}$ and $45_{b1}, \ldots, 45_{bM}$, respectively.

Figure 3:
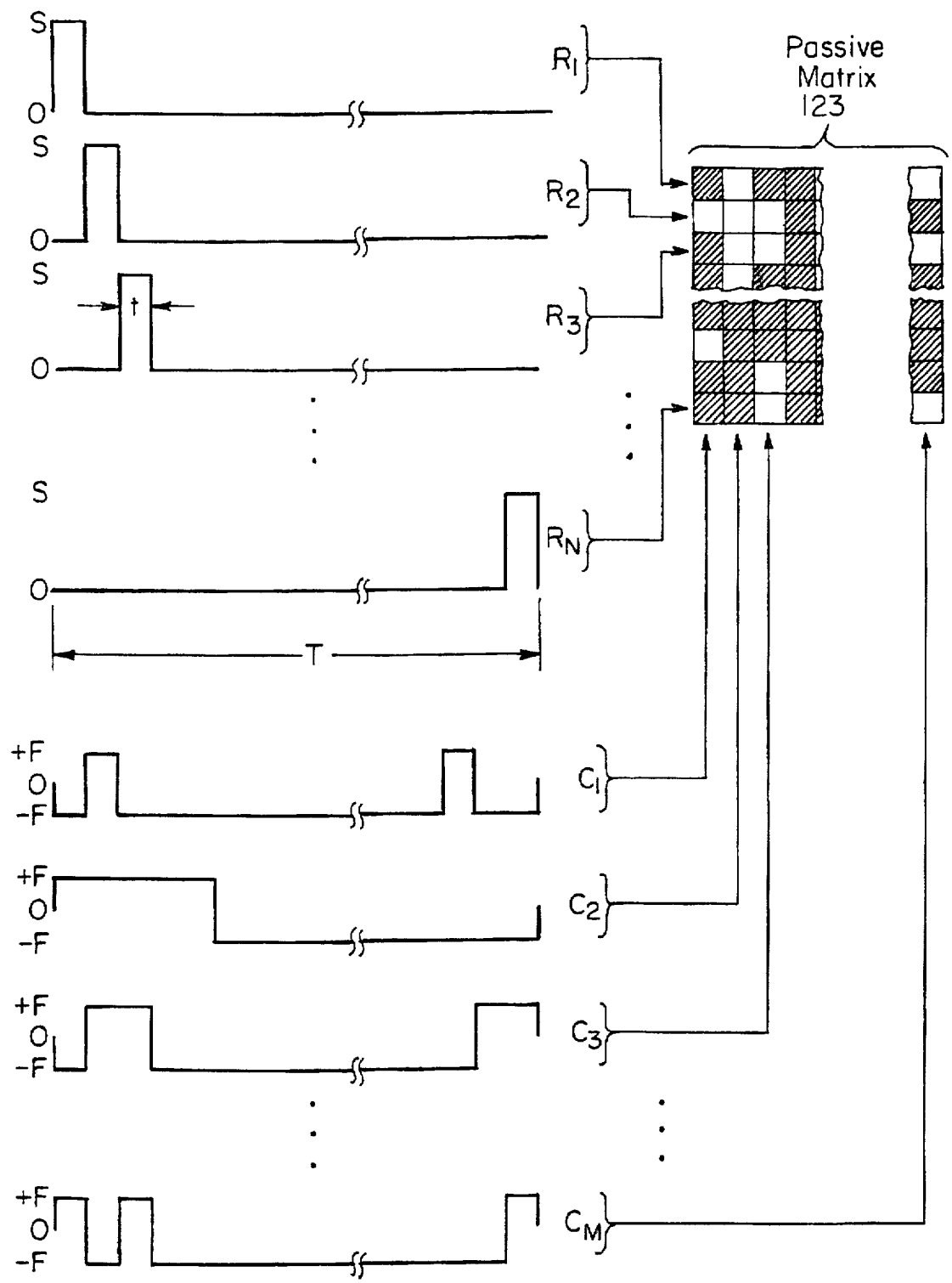
FIG. 3 is a graphical representation of example multiplexed waveforms for driving a passive matrix display.

In standard multiplex addressing, the column signals is generated by sequentially reading from memory an information element $I_{ij}$ corresponding to the pixels of the $i^{th}$ display row and the $j^{th}$ display column in setting the column voltage during successive row scans. If the information element $I_{ij}$ indicates an activated (i.e. "on") pixel then the column voltage is set to −F. If the information element $I_{ij}$ indicates an inactivated (i.e. "off") pixel, then the column voltage is set to +F. Because the pixel is defined by the overlap of the row and column electrodes, the pixel voltage is the difference between the corresponding row and column signals. During the corresponding row select interval, $\Delta t$, an activated pixel is subjected to a pixel voltage of S+F and an inactivated pixel is subjected to a pixel voltage of S−F. During the other row select intervals the pixel voltage is either +F or −F. Thus, an activated pixel has a slightly higher RMS voltage than an inactivated pixel. An example of addressing using standard multiplexing is illustrated in FIG. 3, where activated pixels in the passive matrix 123 are shaded and inactivated pixels are unshaded, consistent with a normally white mode of operation.

The RMS voltage required to activate a pixel is given by $$V_{on} = \frac{1}{\sqrt{N}} \sqrt{F^2(N-1)+(S+F)^2} . \quad (1)$$

The RMS voltage required to inactivate a pixel is given by $$V_{off} = \frac{1}{\sqrt{N}} \sqrt{F^2(N-1)+(S+F)^2} . \quad (2)$$

The selection ratio is defined as $V_{on}/V_{off}$. When $$\frac{S}{F} = \sqrt{N} , \quad (3)$$

a maximized selection ratio is given by $$\frac{V_{on}}{V_{off}} = \sqrt{\frac{\sqrt{N}+1}{\sqrt{N}-1}} . \quad (4)$$

The basis ratio is defined as $$\frac{F}{S+F} . \quad (5)$$

From Equations 3 and 5, the optimized bias ratio is expressed as $$\frac{1}{\sqrt{N}+1} . \quad (6)$$

Regardless of the nature of the drive waveforms, it is not possible to achieve a significantly higher selection ratio than that expressed by Equation 6.

By choosing F such that $$F = \sqrt{\frac{\sqrt{N}}{2(\sqrt{N}-1)}} , \quad (7)$$

$V_{off}=1$ and all voltages are normalized with respect to the nonselect RMS voltage, $V_{off}$. For typical liquid crystal materials, the threshold voltage, corresponding to $V_{off}$ is typically 1.5–2.5 volts. An activated pixel requires a voltage higher than $V_{off}$.

In a passive matrix employing standard multiplex addressing the bias ratio is a function of $\sqrt{N}$. As the number of scan lines, N, increases, the bias ratio approaches zero and the selection ratio approaches unity. Consequently, the difference between $V_{on}$ and $V_{off}$ becomes less distinguishable as N increases. The dependence on the number of scan lines is summarized in Table I for various common values of N. Thus, standard multiplexing is considered inappropriate for driving a large number (greater than about 200) of scan lines.

TABLE I

| N | Selection Ratio | Bias Ratio |
|---|---|---|
| 32 | 1.196 | 0.150 |
| 128 | 1.093 | 0.081 |
| 240 | 1.067 | 0.061 |
| 256 | 1.065 | 0.059 |
| 480 | 1.047 | 0.044 |
| 512 | 1.045 | 0.042 |
| 768 | 1.037 | 0.035 |
| 1024 | 1.032 | 0.030 |

A number of approaches may be used to limit the effect of a large number of scan lines on high resolution displays. In a preferred embodiment, each column driver 44 continues to drive M column electrodes. However, each column electrode intersects exactly N/n scan line electrodes, where n is an integer. In particular, n=2 such that the upper column driver 44a drives column electrodes that intersect the upper one-half of the row electrodes, $R_1, \ldots, R_{N/2}$. Likewise, the lower column driver 44b drives column electrodes that intersect the lower one-half of the row electrodes, $R_{N/2}, \ldots, R_N$. As the number of scan lines N increases, the columns may be further segmented into n=3,4 . . . segments, each segment intersecting less than about 200 row electrodes.

Because of the problems associated with the standard addressing multiplex method, a preferred embodiment of the invention comprises active addressing, as described by T. J. Scheffer and B. Clifton, "Active Addressing Method for High-Contrast, Video-Rate STN Displays", *SID* 1992 *Digest of Technical Papers XXIII* (1992):228–231, herein incorporated by reference. Briefly, a row addressing matrix, A, is defined having N rows and $2^8$ columns. Orthonormal row functions are derived from Walsh functions, which are a complete set of $2^8$ orthonormal functions, each function having $2^8$ equal time intervals, $\Delta t$, per period, T, with a value of either +1 or −1 during each time interval, $\Delta t$. First, N functions are chosen from the $2^8$ available Walsh functions. Preferably, the lowest sequency function is excluded because that function is a constant function that would introduce a net DC pixel voltage. The chosen N functions are assigned to a respective row of the matrix, A. Next, about one-half of the rows in the matrix, A, are selected at random. The polarity of the randomly selected rows are reversed relative to the nonselected rows. Reversing the polarities of the randomly selected rows preserves the orthonormal property of the system. The row addressing signals applied to the row electrodes $R_1, \ldots, R_N$ are obtained from the rows on the matrix A by a constant F, where F is chosen according to Equation 7.

The column signal voltage for a column j during the $k^{th}$ time interval, $\Delta t_k$, is $$V_j(\Delta t_k) = \frac{F}{\sqrt{N}} \sum_{i=1}^{N} I_{ij}A_i(\Delta t_k), \quad (8)$$

where $I_{ij}$ are information elements representing an activated pixel by a value of +1 and a deactivated pixel by a value of −1; $A_i(\Delta t_k)$ are elements of the row addressing matrix for row i and time interval $\Delta t_k$ (i.e., the Walsh function value) having a value of either −1 or +1. Note that the product within the summation is equivalent to an exclusive-or (XOR) logical operation. Thus, the column voltage equation can be reduced to $$V_j(\Delta t_k) = \frac{F}{\sqrt{N}} (2D_j(\Delta t_k) - N), \quad (9)$$

where $D_j(\Delta t_k)$ is the number of matches between elements in the $j^{th}$ column of the information matrix, I, and corresponding elements in the $k^{th}$ column of the row addressing matrix, A.

Gray levels are important for presenting information on LCDs. Gray levels in TN and STN displays may be achieved using frame modulation, pulse-width modulation, or a combination of the two. In frame modulation, select and nonselect voltages are applied to a pixel during different frames throughout a cycle of frames. Because the response time of the LCD is generally much longer than the frame period, the pixels respond to an average of the select and nonselect voltages weighted by the fraction of time the pixel receives each voltage. This averaged RMS voltage is intermediate between the select and nonselect voltages. Thus, the pixel will be switched into an intermediate optical state, or gray level, between the activated and inactivated states.

In a pulse-width modulated gray level addressing method, the column voltage is held at −F, corresponding to an activated state for a certain fraction, f, of the select interval, Δt, and then switched to +F, corresponding to an inactivated state during the remaining fraction, (1−f), of the select interval, Δt. During the row select time interval, Δt, the pixel voltage amplitude in a standard addressing multiplex method is S+F for the fraction f and S−F for the remaining fraction (1−f). Over the remaining N−1 time intervals of the frame period the pixel voltage amplitude is either +F or −F. The RMS voltage appearing across the pixel is therefore $$V_{grey}(f) = \frac{1}{\sqrt{N}} \sqrt{F^2(N-1) + f(S+F)^2 + (1-f)(S-F)^2} \quad , \qquad (10)$$

which is intermediate between the inactivating and the activating RMS voltages, $V_{off}$ and $V_{on}$, obtained by setting f=0 and f=1, respectively.

To prevent detrimental DC effects from occurring in the liquid crystal layer, the polarity of all signals is reversed o hevery frame. A polarity switch 20 receives the frame switch signal from line 17 and in response, generates a new polarity for the column drivers 44a,44b over signal line 21.

In an alternative embodiment, alternate columns in the passive matrix 123 operate at opposite polarities. In other words, the even column electrodes are operated at the opposite polarity of the odd column electrodes. The polarities of the column electrodes are reversed on each sequential frame. To this end, the column drivers 44a,44b comprise inverters on alternating column pathways. For example, on one frame even column electrodes operate at a positive polarity and odd column electrodes operate at a negative polarity. On the next sequential frame, the polarity switch 20 switches the polarity of the signal on line 21. The polarity inversion switches the polarities of the odd and even columns. As a result, the even column electrodes operate at a negative polarity and the odd column electrodes operate at a positive polarity.

In a preferred embodiment of the invention, the display device of FIG. 2 is patterned as a single silicon-on-insulator (SOI) structure and transferred to a glass substrate. A passive matrix display panel is illustrated in the cross-sectional view of FIG. 4. The fabrication and transfer process are explained in detail in U.S. patent application, Ser. No. 07/944,207 filed Sep. 11, 1992, that has been incorporated herein by reference. Briefly, the device is formed by placing liquid crystal material 350 between two transparent plates. The upper plate 100 comprises an ITO layer 110, a cover glass 120, a polarizer 130, a glass substrate 140, SOI circuitry 154 and electrodes 155 attached to 140 by an epoxy 152. Also shown are conductors 151 and 153, which operate as electrical connectors. An oxide layer 156 insulates the circuitry from liquid crystal material 350 which is sealed by seals 310. The lower plate 200 is similarly constructed. Various novel SOI passive matrix structures will next be described.

Figure 4A:
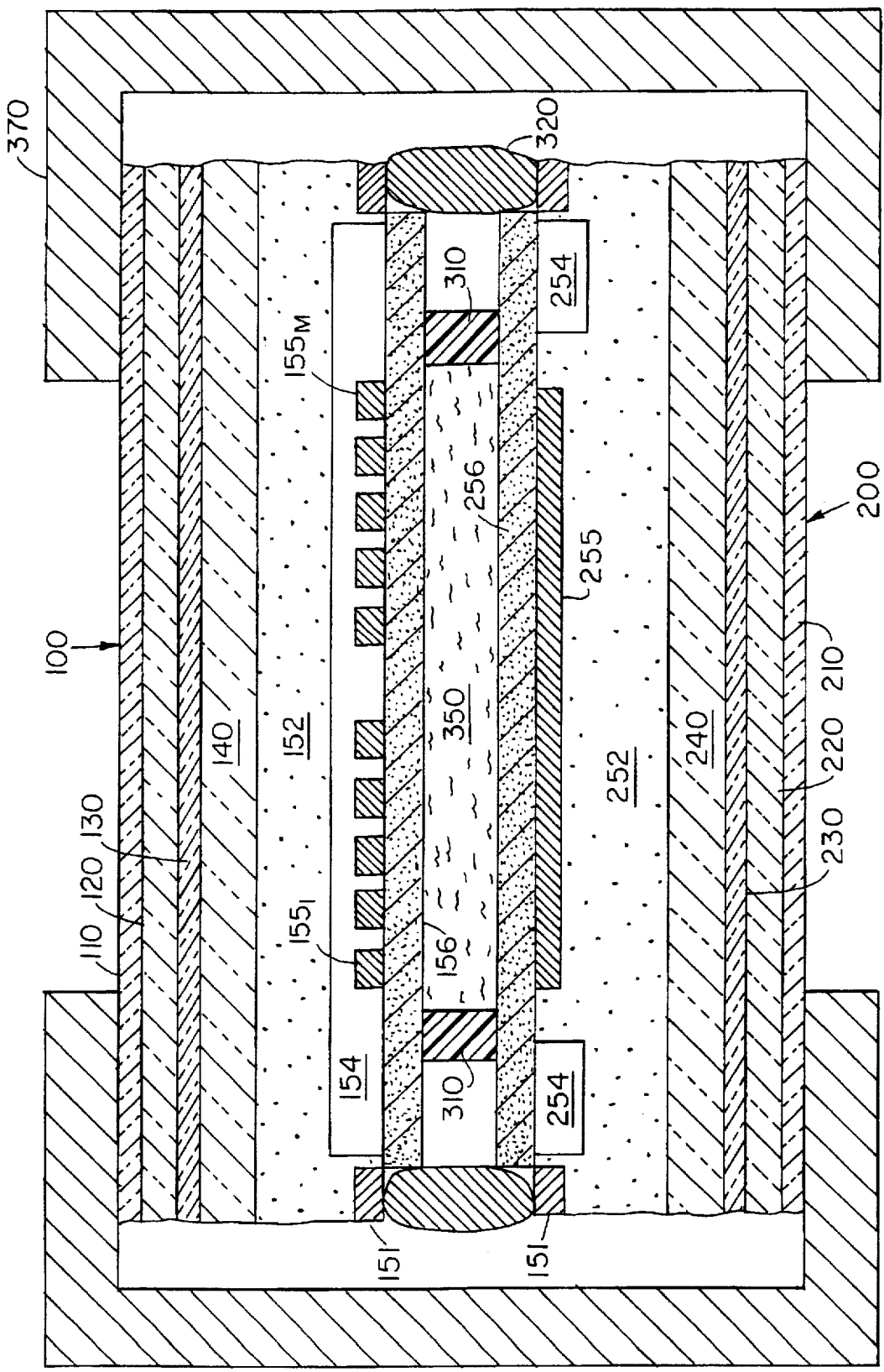
FIG. 4A is a cross-sectional view of a passive matrix display panel.
Figure 4B:
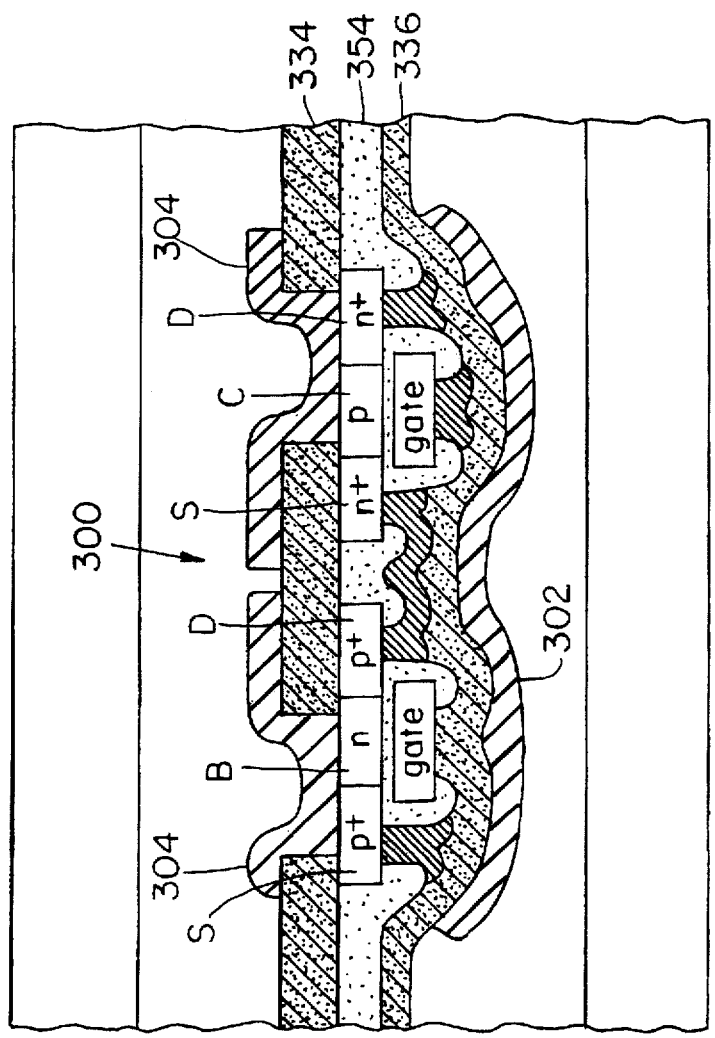
FIG. 4B is a cross-sectional view of a CMOS device for a driver circuit.

Shown in FIG. 4B is a complementary metal oxide semiconductor (CMOS) driver 300 which can be formed on the SOI wafer that is-used to form all of the tiles used for driving the passive matrix display, and carrying a light shielding metallization 302 and 304. Light shield 304 also serves to connect the source regions S to the body region B of each MOS device thereby eliminating uncontrolled floating body effects as previously mentioned. The device also includes channel regions C and drain regions D. Insulator 334, oxide 354 and protective layer 336 such as a nitride or oxynitride are also used in CMOS fabrication.

Figure 5A:
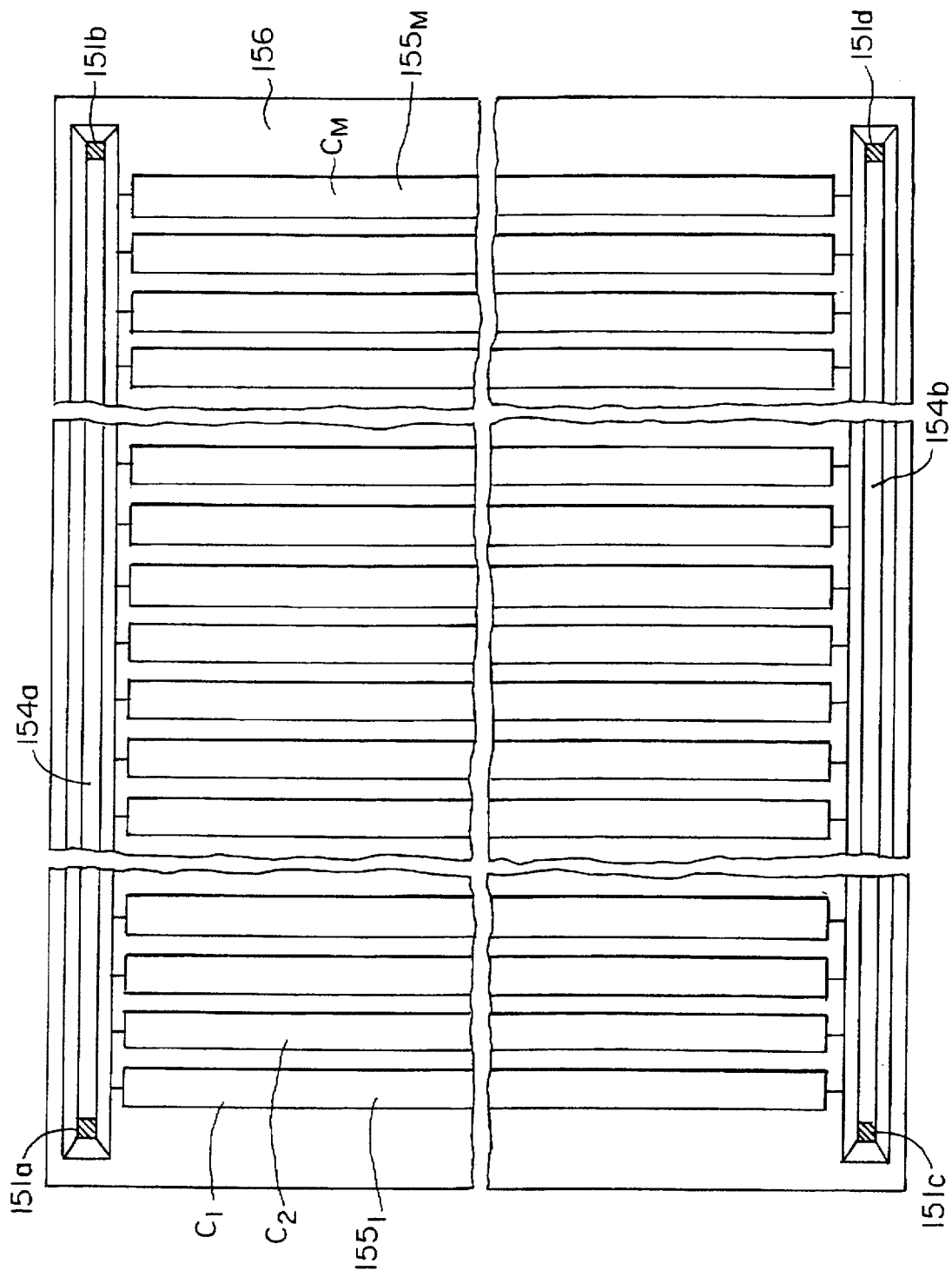
FIG. 5A–5C are schematic diagrams of a preferred embodiment of the invention.
Figure 5B:
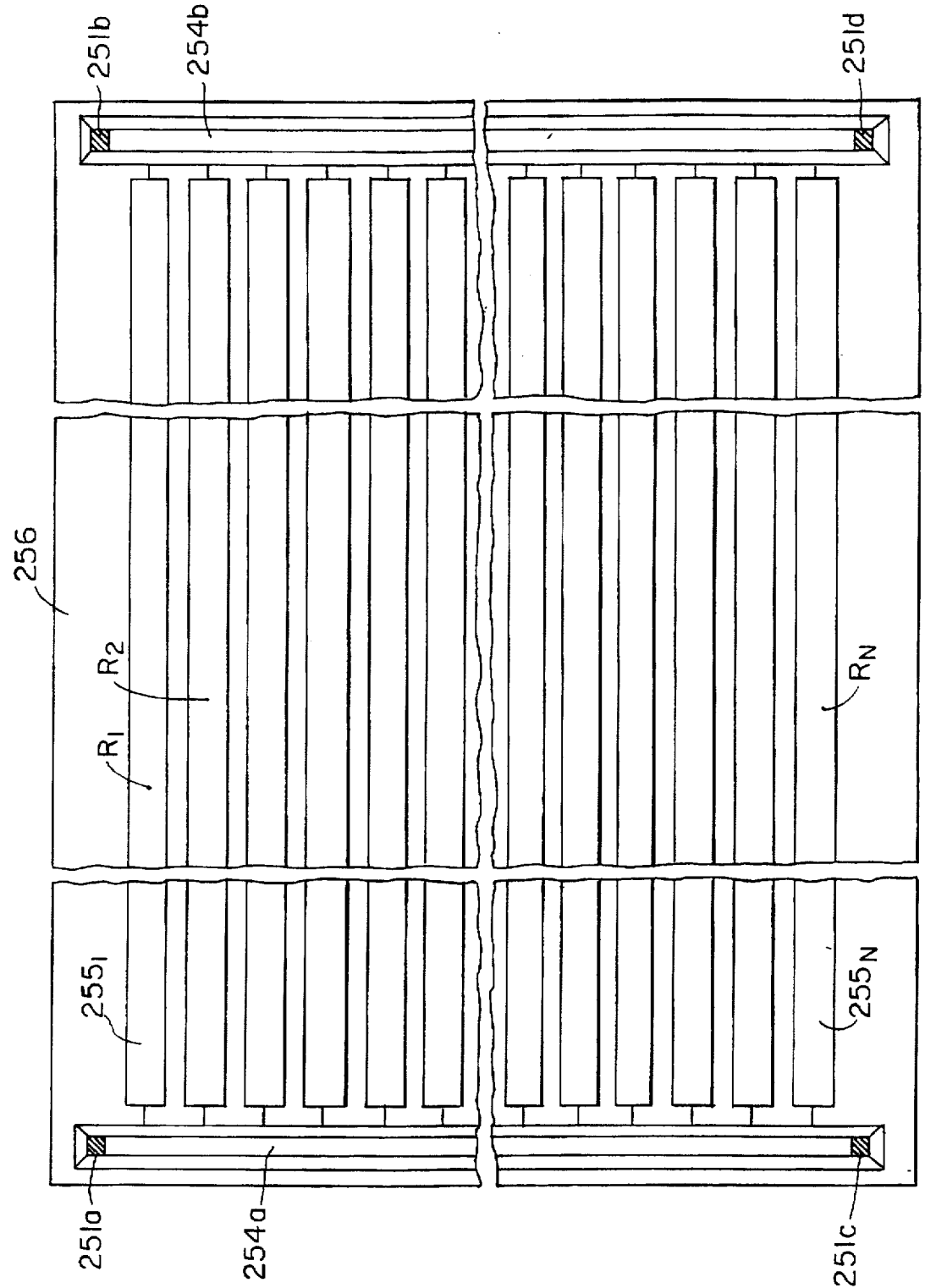
Figure 5C:
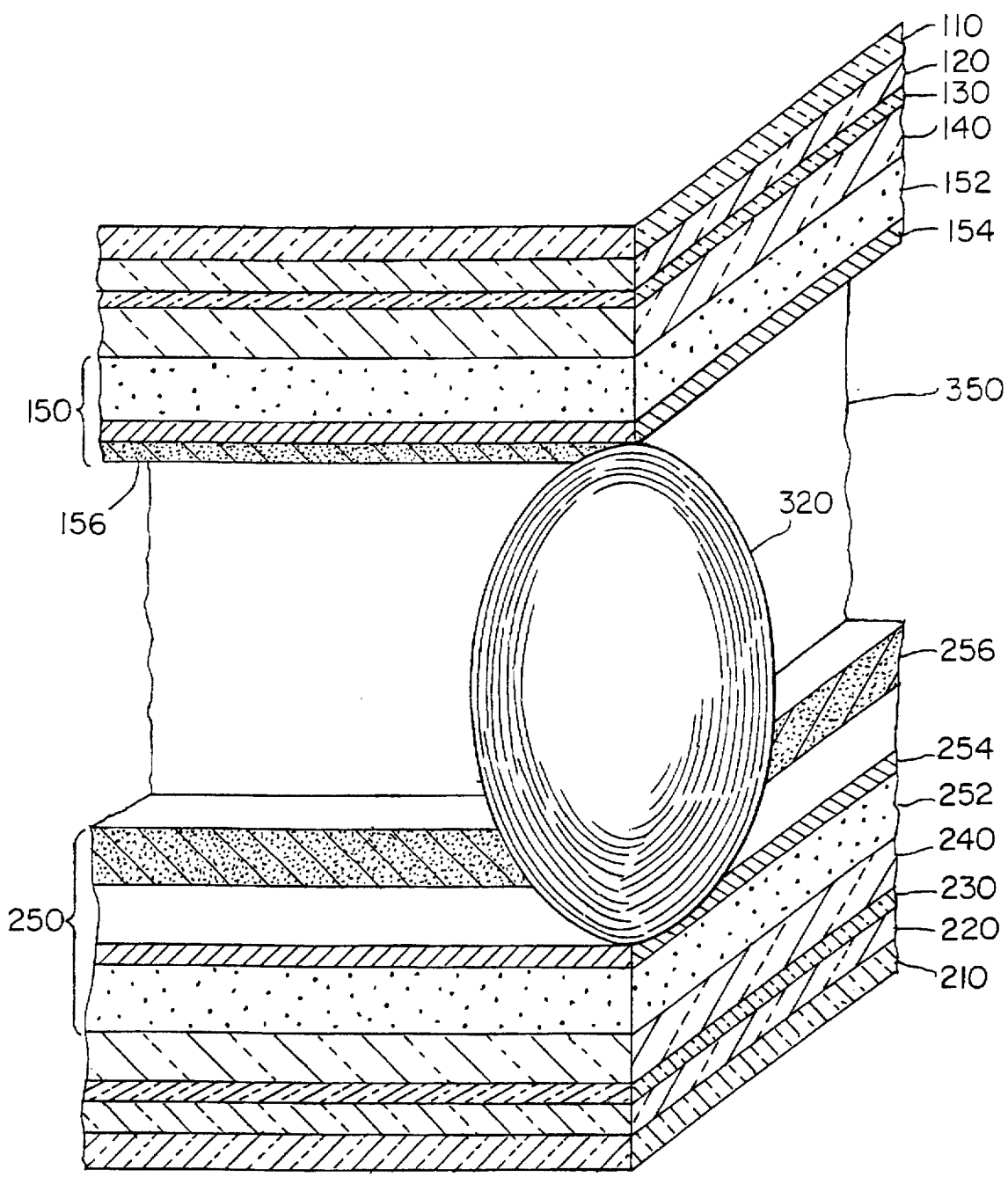

FIGS. 5A–5C are schematic diagrams of a preferred embodiment of the invention. FIG. 5A is a schematic diagram of the upper plate 100 pattern. The column electrodes $155_1, \ldots, 155_M$ are fabricated on the oxide layer 156. The SOI circuitry 154a,154b are also fabricated on the oxide layer 156. In a preferred embodiment, the SOI circuitry 154a,154b comprise the column drivers 44a,44b. In another embodiment, the SOI circuitry 154a also comprises the column shift registers 40, the multiplexer 42. In addition, the video interface 10 and the polarity switch 20 may also be fabricated on the SOI circuits 154a,154b.

FIG. 5B is a schematic diagram of the lower plate 200 pattern. The row electrodes $255_1, \ldots, 255_N$ are fabricated on the oxide layer 256. Also fabricated on the oxide layer are SOI circuits 254a,254b. In a preferred embodiment, the SOI circuits 254a,254b comprise the row drivers 32a,32b. In another embodiment-of the invention, one of the SOI circuits 254 also comprises row shift register 30.

FIG. 5C is a partial cross-sectional view of a corner of the passive matrix display panel. An electrical contact between the upper plate 100 and the lower plate 200 is provided by a solder bump 320. Solder bumps 320 contact the upper plate 100 through contact pads 151a–151d and the lower plate 200 through contact pad 251a–251d, as shown in FIGS. 4A and 4B, respectively. The display device comprises four solder bumps 320 at each corner of the display panel. One solder bump conducts DC power, another solder bump conducts synchronization signals (i.e., line 11 of FIG. 2). Another solder bump may provide a common ground between the upper plate 100 and the lower plate 200. Any unused solder bumps 320 may be left electrically floating.

Figure 6A:
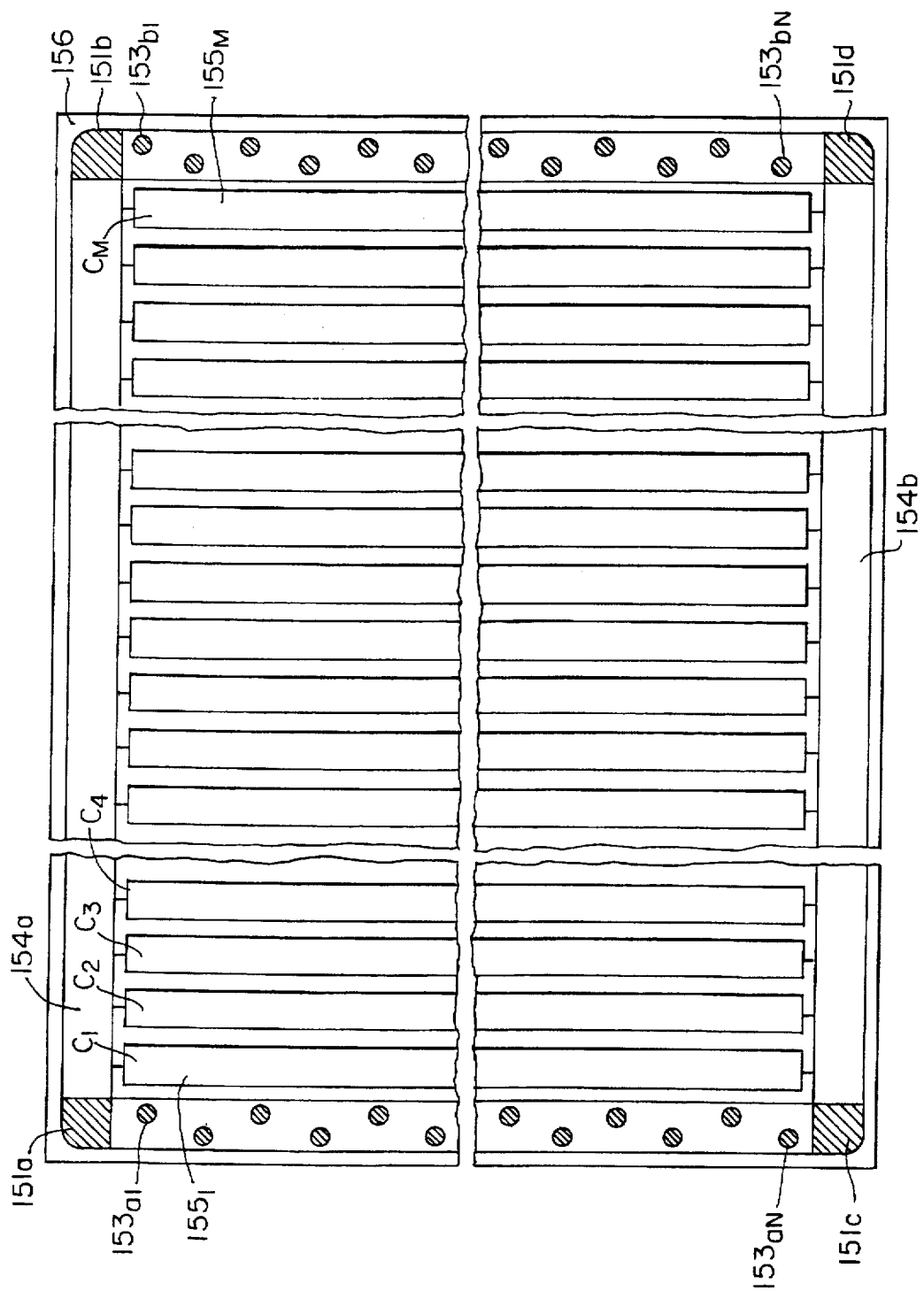
FIG. 6A–6C are schematic diagrams of an alternative preferred embodiment of the invention.
Figure 6B:
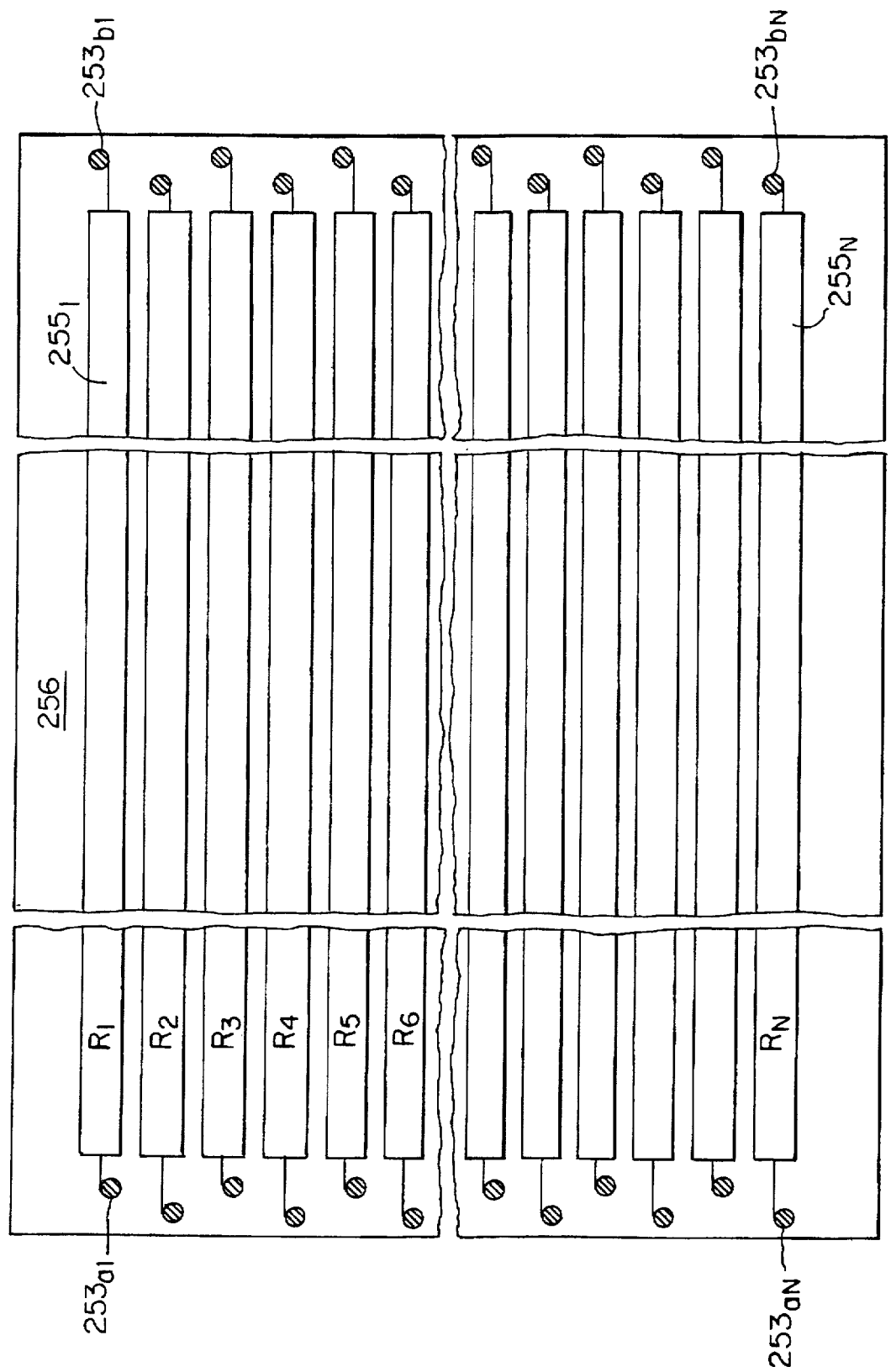
Figure 6C:
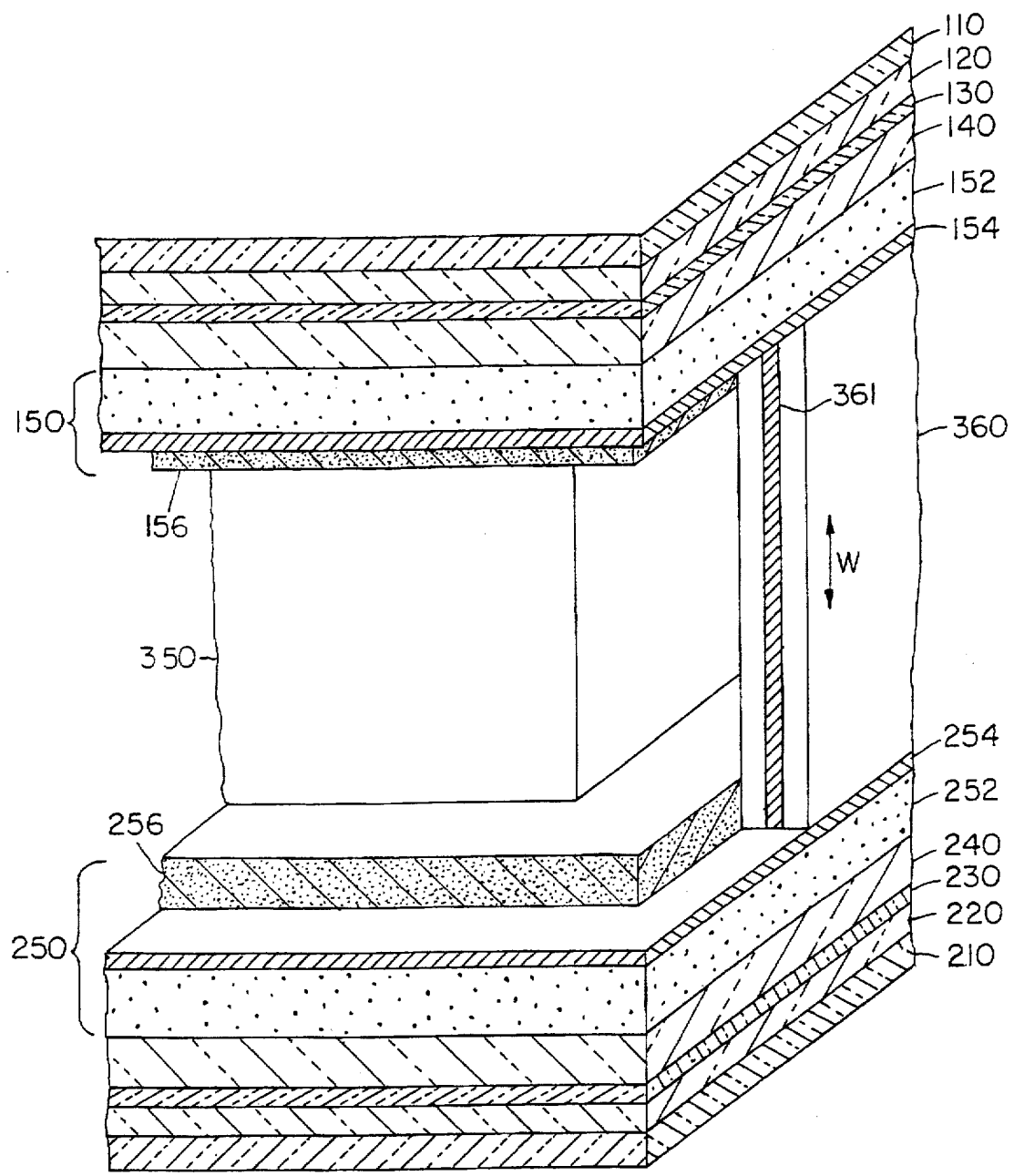

Another embodiment of the invention is illustrated in FIGS. 6A–6C. In this embodiment all circuitry is fabricated on a single layer. The upper plate 100 comprises all circuitry. In a preferred embodiment of the invention, all circuitry is located on the column layer. The column layer is chosen because the more complicated circuitry is associated with the column electrodes $155_a, \ldots, 155_M$.

FIG. 6A is a schematic diagram of the upper column plate 100. The column electrodes $155_1, \ldots, 155_M$ are fabricated on the oxide layer 156. The SOI circuitry 154a,154b are also fabricated on the oxide layer 156. The SOI circuitry 154a, 154b comprise the column drivers 44a,44b and the row drivers 32a,32b. The SOI circuitry 154a,154b may also comprise the column shift register 40 the multiplexer 42 and the row shift register 30.

In a preferred embodiment the SOI circuitry 154 further comprises the video interface 10 and the polarity switch 20. Contact points 153 are provided to supply select line voltage to the row electrodes in the lower plate 200. Contact pads $153_{a1}, \ldots, 153_{aN}$ provide left-hand side select line signals for rows 1, . . . ,N respectively. Likewise, contact pads $153_{b1}, \ldots, 153_{bN}$ supply right-hand side select line signals.

FIG. 6B is a schematic diagram of the SOI pattern for the lower plate 200. Fabricated on the oxide layer 256 are row electrodes $255_1, \ldots, 255_N$. Each respective row electrode 255 is connected to contact pads 253a,253b on either side. Contact pad $253_{a1}, \ldots, 253_{aN}$ provide electrode power to the left-hand side of the row electrodes 255. Left-hand contact pads $253_{a1}, \ldots, 253_{aN}$ are fabricated so they align with left-hand contact pads $153_{a1}, \ldots, 153_{aN}$ located on the upper plate 100. Right-hana-contact pads $253_{b1}, \ldots, 253_{bN}$ are similarly fabricated.

FIG. 6C is a partial cross-sectional view of the passive matrix display panel as configured in FIGS. 6A–6B. The construction features a lateral conductor 360 of the type that conducts electricity only in the direction of its width W. Alternatively, the upper contact pads 153a,153b may be wire-bound to the lower contact pads 253a,253b. Note that solder bumps are not shown because there is no circuitry on the lower plate 200. Power is supplied to the row electrodes through the conductor 360. However, solder bumps may be provided to supply a grounding connection or to add stability to the display panel.

Figure 7A:
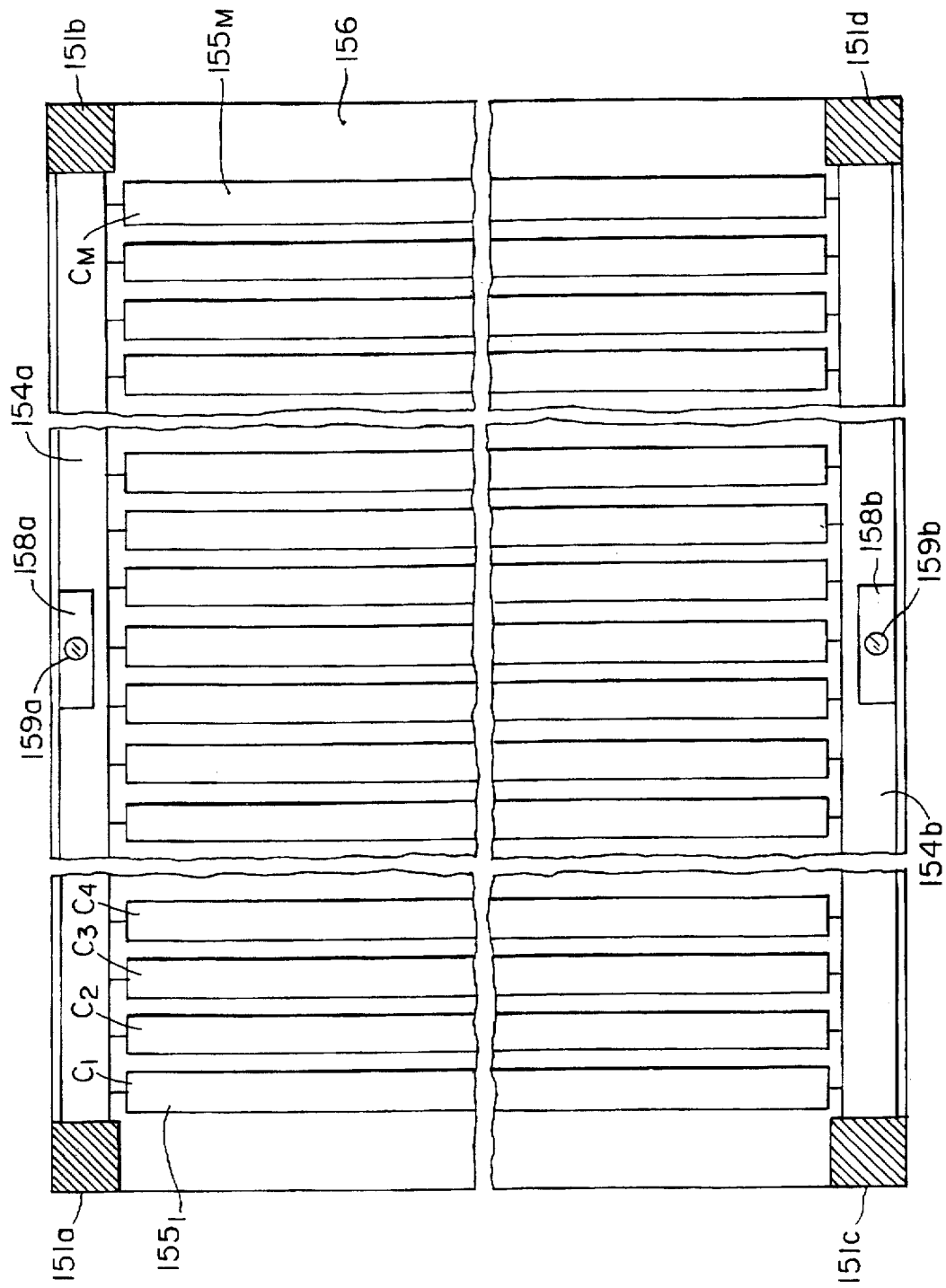
FIG. 7A–7C are schematic diagrams of another alternative preferred embodiment of the invention.
Figure 7B:
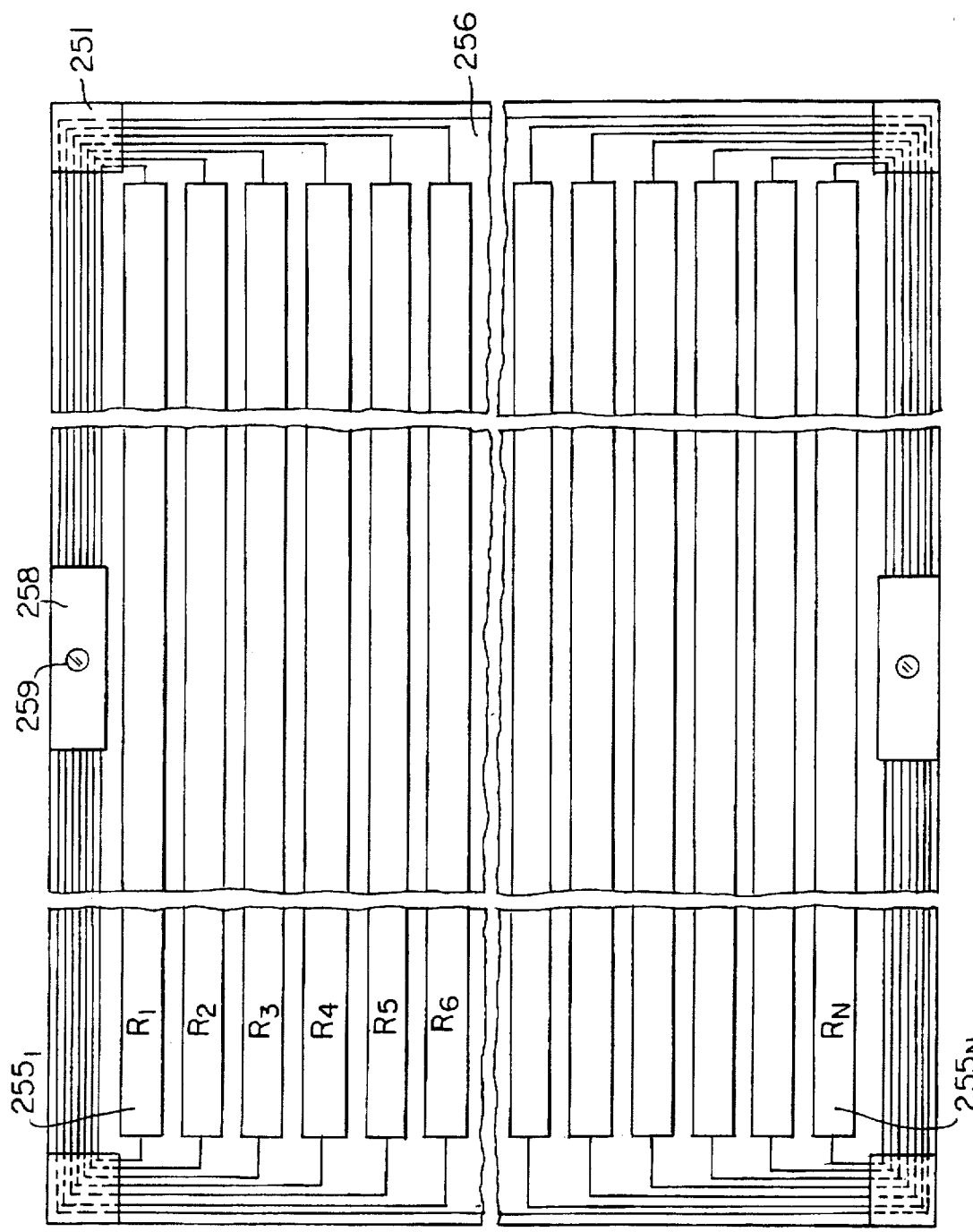
Figure 7C:
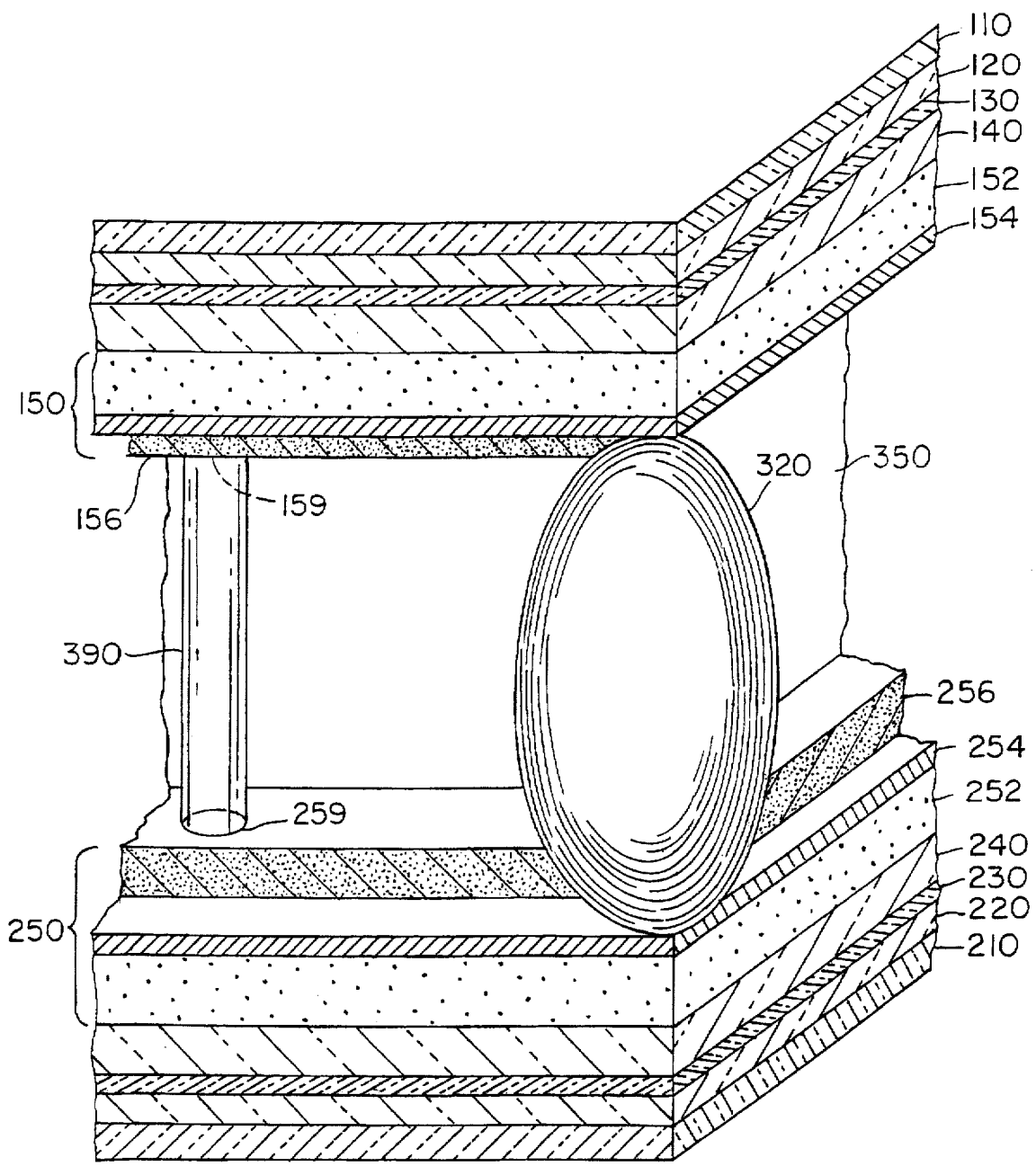

FIG. 7A–7C are schematic diagrams of another preferred embodiment of the passive matrix display device. Again, the majority of circuitry is located on the upper-column plate 100. As shown in FIG. 7A, fabricated on the oxide layer 156 are column electrodes $155_1, \ldots, 155_N$ and SOI circuitry 154a,154b. The SOI circuitry 154a,154b comprise the same circuitry as described in FIG. 6A. In addition, SOI circuit optical encoders 158a,158b are also fabricated on the oxide layer 156. The optical encoders 158a,158b encode select line data into an optical signal for transmission through a respective optical lens 159a,159b. In an preferred embodiment, there are two optical encoders 158a,158b and optical lenses 159a,159b. Each encoder lens pair 158,159 signals a respective top or bottom portion of the select lines.

The fabrication of the select lines is schematically shown in FIG. 7B. The row electrodes $255_1, \ldots, 255_N$ are fabricated on the oxide layer 256. In addition, optical decoders 258a, 258b are fabricated on the oxide layer 256. The optical decoders 258a,258b comprise a respective optical lens 259a, 259b for receiving a signal from a respective optical encoder 158a,158b, which is located on the upper plate 100. In a preferred embodiment, there are two optical decoders 258a, 258b and lenses 259a,259b. One decoder-lens pair 258a, 259a drives the upper half of the row electrodes $255_1, \ldots, 255_{N/2}$. The other decoder-lens pair 258b,259b controls the bottom half of the row electrodes $255_{N/2}, \ldots, 255_N$.

FIG. 7C is a partial cross-sectional view of the passive matrix display panel using an optical link between the upper plate 100 and the lower plate 200. The lenses 159,259 are aligned during fabrication of the display panel. Disposed between the lenses 159,259 is an optical waveguide 390. Power and ground signals are simultaneously provided to the upper plate 100 and lower plate 200 through respective pads 151a–151d and 251a–251d. The respective pads 151, 251 are connected through solder bumps 320 as previously discussed.

The above embodiments may further comprise a polyimide film formed between the ITO electrode strips and the liquid crystal material. The polyimide film functions as a liquid crystal alignment layer. The polyimide film is rubbed down to a thickness of about 300–100 Å. The addition of a polyimide alignment layer reduces the level of crosstalk by changing the RC time constant across the electrode.

EQUIVALENTS

While this invention has been particularly shown and described with reference to preferred embodiments thereof, it will be understood by those skilled in the art that various changes in form and details may be made therein without departing from the spirit and scope of the invention as defined by the appended claims.

We claim:

1. A liquid crystal display system comprising:
   a matrix of pixels formed by a first plurality of parallel electrodes positioned in a first plane, each of the first electrodes being separated from adjacent first electrodes by a first gap and a second plurality of electrodes positioned in a second plane, each of the second electrodes being separated from adjacent second electrodes by a second gap, the first electrodes being bonded to a first optically transparent substrate with an adhesive layer on a first side of a liquid crystal material and the second electrodes being bonded to a second optically transparent substrate with an adhesive layer on a second side of the liquid crystal material, a longitudinal axis of the first electrodes being substantially at right angles to a second longitudinal axis of the second electrodes, a plurality of pixels being defined at overlap regions between the first and second electrodes; and
   a control circuit formed in a thin film of single crystal silicon on an insulating layer to form an SOI structure that is bonded to the first optically transparent substrate with an adhesive layer, the control circuit being conductively connected to the first plurality of electrodes.

2. The system of claim 1 wherein the control circuit further comprises a first controller for controlling the first electrodes and a second controller for controlling the second electrodes, the second controller being electrically connected to the second plurality of electrodes.

3. The system of claim 2 wherein the first electrodes are column electrodes and the second electrodes are row electrodes, the first controller comprises a column controller for driving the column electrodes in response to an input video signal and the second controller comprises a row controller for driving the row electrodes in response to the input video signal.

4. The system of claim 3 wherein the first controller and the second controller are formed in a silicon on insulator structure as the first electrodes.

5. The system of claim 4 wherein the second electrodes are coupled to the second controller by an electrically conductive interconnect.

6. The system of claim 3 wherein the first controller further comprises a video interface for coupling the system to a video signal source, the video interface generating a pixel data signal, a pixel clock signal, a scan line clock signal, and a frame switch signal in response to the input video signal.

7. The system of claim 6 wherein the column controller comprises:
   a column shift register coupled to the video interface for generating a column select signal in response to the pixel clock signal;
   a multiplexer coupled to the column shift register and the video interface for generating a column addressing signal in response to the pixel data signal and th e pixel select signal;
   a polarity switch coupled to the video interface for generating a polarity signal, the polarity being reversed at invocation of each sequential frame in response to the frame switch signal; and
   a first column driver coupled to the multiplexer and the polarity switch for driving a first end of the column electrodes, a second column driver coupled to the multiplexer and the polarity switch for driving a second end of the column electrodes, the column drivers simultaneously being responsive to the column addressing signal and the polarity signal.

8. The system of claim 7 wherein the multiplexer performs an active addressing multiplex.

9. The system of claim 6 wherein the row controller comprises:
   a row shift register coupled to the video interface for generating a row select signal in response to the scan line clock signal; and
   a first row driver coupled to the row shift register for driving a first end of the column electrodes and a second row driver coupled to the row shift register for driving a second end of the column electrodes, the row drivers simultaneously responding to the row select signal.

10. A liquid crystal display system comprising:

a matrix of pixels formed by a first plurality of parallel electrodes separated by a first gap and a second plurality of electrodes separated by a second gap, the first electrodes being bonded to a first optically transparent substrate with an adhesive layer on a first side of a liquid crystal material and the second electrodes being bonded to a second optically transparent substrate with an adhesive layer on a second side of the liquid crystal material, a longitudinal axis of the first electrodes being non-parallel to a second longitudinal axis of the second electrodes, a plurality of pixels being defined at overlap regions between the first and second electrodes to provide a display area of the liquid crystal display, the display area extending in a plane where the display area is two inches by two inches or less;

a first control circuit formed in a first thin film of single crystal silicon having an SOI structure that is bonded to the first optically transparent substrate with an adhesive layer and conductively connected to the first plurality of electrodes; and a second control circuit formed in a second thin film of single crystal silicon having an SOI structure that is bonded to the second substrate with an adhesive layer and conductively connected to the second electrodes.

11. The system of claim 10 wherein the display area is one inch by one inch or less.

12. The system of claim 10 wherein the first or second electrodes further comprise electrically conductive single crystal silicon.

13. The system of claim 10 wherein the first control circuit and the second control circuit comprises an active addressing circuit including:

a row driver formed from a first layer of single crystal silicon and interconnected with the row electrodes; and a column driver formed from a second layer of single crystal silicon and interconnected with the column electrodes.

14. The device of claim 13 wherein there are at least two row drivers and at least two column drivers, each end of a row electrode being connected to a row driver and each end of a column electrode being connected to a column driver.

15. The system of claim 13 wherein the active addressing circuit sends a first waveform over a select row electrode and a second waveform over a select column electrode to activate the select display pixel.

16. The system of claim 13 wherein the number of row electrodes is greater than about 200.

17. The system of claim 13 wherein the electrodes are formed from single crystal silicon.

18. The system of claim 13 wherein the active addressing circuit derives orthonormal row functions for driving the row electrodes.

* * * * *